United States Patent [19]

Mitchell, III

[11] 3,897,328

[45] July 29, 1975

[54] IRIDIUM-CONTAINING REFORMING CATALYST AND USE THEREOF

[75] Inventor: Howard Lee Mitchell, III, Baton Rouge, La.

[73] Assignee: Exxon Research and Engineering Company, Linden, N.J.

[22] Filed: Oct. 29, 1973

[21] Appl. No.: 410,710

[52] U.S. Cl. ............... 208/139; 208/138; 252/441; 252/439; 252/466 PT
[51] Int. Cl..... C10g 35/08; B01j 11/78; B01j 11/12
[58] Field of Search ............ 208/138, 139; 252/439, 252/441, 466 PT

[56] References Cited
UNITED STATES PATENTS

| | | | |
|---|---|---|---|
| 2,848,377 | 8/1958 | Webb | 208/139 |
| 2,906,701 | 9/1959 | Stine et al. | 208/138 |
| 3,109,038 | 10/1963 | Myers | 208/139 |
| 3,173,856 | 3/1965 | Burton et al. | 208/138 |
| 3,410,789 | 11/1968 | Ransch | 208/139 |
| 3,554,902 | 1/1971 | Buss | 208/138 |
| 3,655,747 | 4/1972 | Sennewald et al. | 252/466 PT |

*Primary Examiner*—Delbert E. Gantz
*Assistant Examiner*—James W. Hellwege
*Attorney, Agent, or Firm*—L. A. Proctor

[57] ABSTRACT

An iridium-containing catalyst, particularly one comprising platinum, iridium, and palladium composited with a porous inorganic oxide base, is found useful in hydrocarbon conversion reactions, particularly reforming (hydroforming). A naphtha or straight run gasoline can be contacted with such catalyst at reforming conditions in the presence of hydrogen to improve the octane quality of the naphtha or gasoline.

33 Claims, 1 Drawing Figure

GRAPHIC DATA DEPICTING RUNS CONDUCTED WITH PARAFFINIC AND NAPHTHENIC FEEDS, RESPECTIVELY, COMPARING CONVENTIONAL REFORMING CATALYSTS AT OPTIMUM CONDITIONS WITH CATALYSTS OF THIS INVENTION AT SULFUR CONCENTRATIONS OF 1.0 P.P.M. AND 0.4 P.P.M.

IRIDIUM-CONTAINING REFORMING CATALYST AND USE THEREOF

Catalytic reforming (i.e., hydroforming) is an established process in the petroleum refining industry and has been used for improving the octane quality of naphthas and straight run gasolines for many years. Catalysts used in catalytic reforming are recognized as dual-functional, perhaps more accurately polyfunctional, the catalyst composite including a component comprising a metal, or metals, or a compound or compounds thereof, providing a hydrogenation-dehydrogenation (hydrogen transfer) function, isomerization function, hydrocracking function, and/or hydrogenolysis function, and an acidic component providing isomerization, cracking, and/or hydrocracking functions.

The platinum group, or Group VIII noble metals (ruthenium, osmium, rhodium, iridium, palladium and platinum), despite their expense, have been long recognized as particularly efficient hydrogen transfer components. Platinum per se has, in fact, proven par excellence as a hydrogen transfer component and, in fact, possesses a combination of properties which makes it particularly suitable as a component for commercial reforming catalysts. Conventional reforming catalysts have thus long employed platinum composited with an inorganic oxide base, particularly alumina, to which halogen is added to supply the isomerization function. Platinum catalysts have achieved world-wide use in commercial reforming operations.

Iridium-containing catalysts, i.e., catalysts comprising iridium composited with a porous inorganic oxide, have been widely disclosed in the literature as useful for a variety of hydrocarbon conversion reactions, viz., reforming, hydrogenation and dehydrogenation, isomerization, hydrocracking, alkylation and dealkylation, steam reforming, and the like. Iridium has also been used in combination with other noble and non-noble metals and composited with inorganic oxides for use as hydrocarbon conversion catalysts. Such composites have thus included iridium in combination with such other metals as, e.g., platinum; tungsten; platinum and rhenium; platinum and tin; platinum, rhenium and tin; platinum and lead; platinum and zinc; platinum and thallium; platinum and indium; platinum and lanthanides; and platinum and ruthenium. Some of these catalysts have been specifically described as useful in catalytic reforming, or hydroforming.

There is a desideratum in the art, occasioned in large part by the withdrawal of alkyl lead compounds based on ecological considerations, and intensive efforts are again underway to improve the octane quality of naphthas and gasolines, without use of such additives, or by elimination of such additives, by improving reforming catalysts. Improvements have been made, and new species of catalysts have been developed. Despite this, platinum yet maintains a rank of distinction as a component of commercially viable reforming catalysts. Recently, e.g., the industry has turned to catalysts which employ bimetallic components to provide effective hydrogen transfer for improving the octane quality of naphthas and gasolines in commerical operations; and even more recently, attention has turned to multimetallic catalysts, or catalysts which contain three or more hydrogen transfer components, for use in the manufacture of commercially viable reforming catalysts. While iridium per se has not proven outstanding as a hydrogen transfer component for use in commercial reforming, the combination of platinum and iridium has proven particularly effective, surpassing platinum per se as an effective hydrogen transfer component for commercial reforming operations.

Surprisingly, catalysts comprised of composites of platinum and iridium with an inorganic oxide base, particularly alumina, suitable in hydrocarbon conversion reactions, particularly reforming were reported many years ago, and described in U.S. Pat. No. 2,848,377. Such catalyst, however, did not achieve commercial significance, perhaps due to a number of drawbacks. For one thing, the catalyst is very sulfur-sensitive and readily deactivated by high sulfur feeds. Moreover, the initial activity of these catalysts is very high, and serious loss of activity occurs quite rapidly due to an acute tendency of the iridium, when exposed to oxygen at elevated temperatures, to agglomerate, and even to form iridium oxide in admixture with the agglomerated metal. The activity of such catalysts is substantially lowered as a result of the descreased surface area of the metals. Recently, however, it has become practical to regenerate iridium-containing catalysts by redispersal of the metal and, for this reason, inter alia, platinum-iridium catalysts have achieved a position of eminence in the present art of catalytic reforming.

Platinum-iridium catalysts possess outstanding activity for use in reforming operations, activity being defined as that property which imparts the ability to produce aromatics, aromatic production (or octane improvement) generally being measured as a function of temperature, feed rate, etc. Platinum-iridium catalysts also possess good selectivity which is defined as that property which imparts the ability of the catalyst to produce high yields of high octane number $C_5^+$ liquid products with concurrent low production of normally gaseous hydrocarbons, i.e., $C_1$–$C_4$ hydrocarbons, or solid carbonaceous by-products, and coke, which form on the catalysts during reforming. These catalysts also possess good stability or activity maintenance, i.e., activity plotted as a function of time, good stability or activity maintenance being defined as high retention of good activity and selectivity, or continued high activity and stability for prolonged periods during hydrocarbon conversion, or reforming operations.

While any commercially viable reforming catalyst must possess these properties to a significant degree, no catalyst used in real world operations can possess all of these properties to the Ultimate degree. One of these characteristics may be possessed by a catalyst in admirable degree, but the poor quality of another of these characteristics may adversely affect the worth of the catalyst. Thus, a catalyst which possesses good selectivity does not necessarily have good activity, and vice versa. A small decrease in $C_5^+$ liquid yield can thus represent a large debit in commercial reforming operations. Conversely, the worth of a catalyst which possesses high selectivity may be jeopardized by the considerable capital cost which necessitates large charges of noble metals containing catalysts. Proper balance between these several properties is essential in the commercial world and an improvement gained in one property, or characteristic, cannot be too much offset by loss in another if the catalyst is to prove commercially viable.

Platinum-iridium catalysts have been shown to possess outstanding activity, and good selectivity. Iridium, however, is not a plentiful metal and quite expensive. For this reason, inter alia, it is desirable to decrease the amount of iridium employed on the catalyst without significant decrease of the high activity and selectivity of such catalysts. Moreover, it is desired to further improve the basic platinum-iridium catalyst to the extent possible.

Accordingly, it has now been discovered that a catalyst comprising catalytically active amounts of platinum, iridium, and palladium composited with a porous inorganic base, notably alumina, is more sulfur-tolerant, more active, and has greater selectivity for producing gasolines at reforming conditions than, e.g., a catalyst otherwise similar except that it does not contain palladium. In fact, such catalyst has better selectivity than a catalyst otherwise similar except that it does not contain palladium and has an even higher concentration of iridium. Moreover, the activity of such catalyst closely approximates, or approaches, that of higher iridium-containing catalysts, and at certain conditions has activity as good as higher iridium-containing catalysts. A preferred catalyst composition of such character comprises from about 0.05 to about 3 percent platinum, preferably from about 0.1 to about 1 percent platinum, from about 0.05 to about 3 percent iridium, preferably from about 0.1 to about 1 percent iridium, and from about 0.0001 to about 2.5 percent, preferably from about 0.0005 to about 0.15 percent, and more preferably from about 0.0050 to about 0.050 percent of palladium, based on the total weight (dry basis) of the composition. Preferably, also, the sum total of the platinum and iridium contained in such catalyst compositions ranges from about 0.3 to about 1 percent, and more preferably from about 0.45 to about 0.70, based on the weight (dry basis) of the total catalyst compositions. In the more preferred compositions, the atom ratio of iridium:palladium ranges from about 1:1 to about 40:1, and preferably from about 2:1 to about 10:1, whereas the atom ratio of the platinum:iridium ranges from about 0.25:1 to about 5:1, and preferably from about 1:1 to about 2:1. The absolute concentration of the metals used, particularly the iridium and palladium, has a relationship to the atom ratios employed, as does the nature of the feed and the amount of sulfur and nitrogen contained in the feed. In general, the higher iridium content catalysts (i.e., those containing >0.225 wt. percent Ir), for best results, require greater concentrations of palladium, particularly when processing highly paraffinic feeds, and conversely the lower iridium content catalysts (i.e., those containing <0.225 wt. percent Ir, for best results, require lesser concentrations of palladium. Highly naphthenic feeds permit the use of higher palladium concentrations with low iridium to achieve the same degree of effectiveness. For paraffinic feeds, low iridium concentrations require lower palladium concentrations. As the amount of iridium is decreased, the catalyst becomes less tolerant to sulfur contained in the feed, although the sulfur-tolerance of the palladium-containing catalysts is greater than that for the same catalysts without palladium, at all palladium concentrations within the ranges specified.

The catalyst compositions also contain from about 0.1 to about 2.5 percent halogen, preferably from about 0.5 to about 1.5 percent halogen, and from about 0.001 to about 2 percent, and preferably from about 0.001 to about 0.1 percent sulfur, based on the total weight (dry basis) of the catalyst compositions. Such catalysts, at optimum conditions, possess superior $C_5^+$ liquid selectivity, even as compared with catalysts otherwise similar which contain equal or greater amounts of iridium, but no palladium. Moreover, the activity of such catalysts, at optimum conditions, surpasses the activity of catalysts otherwise similar except that they contain no palladium, and is not significantly less than catalysts otherwise similar except that they contain greater amounts of iridium, but no palladium. In the preferred combinations at optimum conditions, the activity of the catalyst is compared favorably with conventional platinum-iridium reforming catalysts run at optimum conditions, and when slightly decreased, as with certain feeds at less than optimum conditions, this disadvantage is more than offset by the enhanced selectivity, the use of a more available and less expensive metal, one which is less susceptible to agglomeration, and other desirable factors. These platinum-iridium-palladium catalysts are far more tolerant to sulfur than catalysts otherwise similar except that they contain no palladium, particularly at low iridium levels.

The catalysts of this invention are particularly suitable for use alone or in admixture with other catalysts, and can be used in one or more of the several stages (or reaction zones) of a multiple stage reforming process, i.e., one wherein a series of reactors is provided with beds of catalysts, the beds of which are serially contacted with preheated feed. They are particularly effective for the treatment of paraffinic feeds, and quite suitable in reactors following the first reactor of the series. In a preferred process of this type, fixed beds of the catalysts are contained in individual reactors (or reaction zones), the naphtha feed is reheated in interstage reheater furnaces to reforming temperatures and, with hydrogen, is passed sequentially through the several reactors of the series. The vapor effluent from the last reactor of the series, a gas rich in hydrogen which usually contains small amounts of gaseous hydrocarbons, is separated from the $C_5^+$ liquid product and recycled to the process to inhibit coke formation on the catalyst. Hydrogen is produced in net amount in the reaction, which is a particular advantage in modern refinery operations.

In the practice of this invention, the metals are composited with mildly or moderately acidic refractory inorganic oxides which are employed as supports, e.g., silica, silica-alumina, magnesia, thoria, boria, titania, zirconia, various spinels and the like including, in particular, alumina, and more particularly gamma alumina, which species are preferred. High surface area catalysts, or catalysts having surface areas ranging upwardly from about 100 $M^2/g$. (B.E.T.) are preferred. In particular, catalysts having surface areas ranging from about 150 to about 600 $M^2/g$. prove quite satisfactory.

The platinum, iridium, and palladium components can be composited or intimately associated with the porous inorganic oxide support or carrier by various techniques known to the art such as ion-exchange, coprecipitation with the alumina in the sol or gel form, etc. For example, the catalyst composite can be formed by adding together suitable reagents such as salts of platinum, iridium, and palladium, and ammonium hydroxide or ammonium carbonate, and a salt of alumina such as aluminum chloride or aluminum sulfate to form aluminum hydroxide. When the metals are included in the preparation of the support, higher concentrations of the metals, particularly of palladium, are often necessary. The aluminum hydroxide containing the salts of platinum, iridium, and palladium can then be heated, dried, formed into pellets or extruded, and then calcined in nitrogen or non-agglomerating atmosphere. The palladium is then usually added to the catalyst by impregnation, if not previously added, typically via an "incipient wetness" technique which requires a minimum of solution so that the total solution is absorbed, initially or after some evaporation, or by adsorption from dilute or concentrated solution. The material is then calcined in non-agglomerating atmosphere and then hydrogen treated, or hydrogen sulfide treated, or both, in situ or ex situ, to reduce the salts and complete the formation of the catalyst composite.

It is generally preferred, however, to deposit all of the metals on the previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent evaporation to effect total uptake of liquid. The catalyst is then dried and, if smaller particles are desired, then crushed to form particles of the desired size ranging, e.g., from about 5 to about 200 mesh (Tyler series), and preferably particles of about 1/10 to about 1/50 inch average diameter can be used. The support material can be treated by contact with a single solution containing the desired amounts of platinum, iridium, and palladium, which is preferred, or treated sequentially by contact with a solution containing one or more metals, and then a solution which contains another metal, or metals, in the desired amounts. The catalyst from any preparative sequence can then be dried, calcined in a non-agglomerating atmosphere and contacted with hydrogen, or hydrogen sulfide, or both, in situ or ex situ, to reduce part or all of the metal salts and activate the catalyst.

The incorporation of an acidic or isomerization component within the catalyst composite is essential. It is preferred to incorporate the acidic or isomerization function required of the catalyst by addition of halide, e.g., fluoride, chloride, and the like, particularly chloride, to the catalyst composite to control the rate of isomerization and cracking. This is conveniently and preferably done during the time of incorporation of the several metals onto the support, or less preferably subsequent to metals addition to the support. The metals thus can be added as halide salts of platinum, iridium and palladium during preparation of these catalysts. Generally, from about 0.1 to about 2.5 weight percent, and preferably from about 0.5 to about 1.5 percent, based on the weight of the total catalyst composite, of the halide is added during manufacture of the catalyst, though halogen can also be added, or replenished, during regeneration or in situ during normal reforming operations. A platinum-iridium-palladium catalyst containing from about 0.5 to about 1.2 percent halogen, particularly chlorine, has been found to provide superior selectively, while yet substantially retaining the activity of the platinum-iridium catalyst. Moreover, the activity can be retained even when the iridium concentration of the catalyst containing the triumvirate of metals is reduced to substantially one-half that which is present in the usual bimetallic composition.

The partially dried catalyst, after incorporation of the metals, and halogen, is then completely dried or calcined in nitrogen or other non-agglomerating medium, either in situ or ex situ, as related to the reactor in which the naphtha reforming reaction is to be carried out. The general method is to carry out the drying in flowing nitrogen while raising the temperature stepwise to avoid too high a concentration of water vapor. The temperature is generally increased to 800°–1,000°F. and the gas flow maintained until the catalyst is essentially completely dry. It is very important that the catalyst be essentially dry before it is reduced or contacted with hydrogen in order to avoid metals agglomeration. The catalyst is then reduced, generally with hydrogen or a hydrogen-containing gas, the platinum and iridium being reduced substantially to the metallic state before the catalyst is subjected to reforming conditions. The reduction is generally carried out by passing the hydrogen through the zone of contact with the catalyst at sufficient velocity to rapidly sweep out the water vapor that is formed. The temperature of reduction is not especially critical, but is generally carried out in the range of about 500° to about 1,000°F. The time required for reduction of the noble metals is generally short and not more than an hour, or at least no more than one to four hours, is generally required to complete the reduction.

Following the reduction, the catalyst is sulfided by contact with a sulfide, generally hydrogen sulfide or compound which will produce hydrogen sulfide in situ. The contact of a hydrogen sulfide-containing gas with the catalyst serves a number of functions, and has a profound influence on the reforming performance of the catalyst. In sulfiding the catalyst, the catalyst is contacted with a dilute gaseous solution, e.g., about 50 to about 5,000 ppm, preferably about 1,000 to about 3,000 ppm, of hydrogen sulfide in hydrogen, or hydrogen plus other nonreactive gases. The contacting of the catalyst with this gas is conducted at about 500 to about 1,000°F., preferably from about 700°F. to about 950°F., and is continued until hydrogen sulfide is detected in the effluent gas. Such treatment incorporates from about 0.001 to about 2 weight percent, and preferably from about 0.01 to about 0.1 weight percent sulfur on the catalyst.

Essentially any hydrocarbon fraction containing paraffins, naphthenes, and the like, admixed one with the other or in admixture with other hydrocarbons, can be converted by means of the catalysts of this invention. A suitable feed, e.g., either virgin or cracked, Fischer-Tropsch or mixtures thereof, is contacted at reforming conditions in the presence of hydrogen (once-through, or recycle) with a catalyst composite including a support which contains catalytically active amounts of the metals. Typical feed stream hydrocarbon molecules are those containing from about 5 to about 12 carbon atoms, or more preferably from about 6 to about 12 carbon atoms, or more preferably from about 7 to about 10 carbon atoms. Naphthas, or petroleum fractions, boiling within the range of from about 80°F. to about 450°F., and preferably from about 125°F. to about 375°F., contain hydrocarbons or carbon numbers within these ranges. Typical fractions thus usually contain from about 20 to about 80 volume percent of paraffins, both normal and branched, which fall in the range of about $C_5$ to $C_{12}$, and from about 20 to about 80 volume percent of naphthenes boiling within the range of about $C_6$ to $C_{12}$. Typical feeds generally contain from about 5 through about 20 volume percent of aromatics which boil within the range of about $C_6$ to $C_{12}$, typically as produced in the product from the naphthenes and paraffins.

It is essential, for best results, that the feed contain a small amount of sulfur. Preferably, the feed shall contain from about 0.05 to about 15 parts, per million parts of feed (ppm), and more preferably from about 0.2 to about 2.0 ppm of sulfur.

The reforming reaction is suitably conducted at temperatures ranging from about 600° to about 1050°F., and preferably at temperatures ranging from about 850° to about 1,000°F. Pressures range generally from about 50 to about 750 psig, and preferably from about 100 to about 500 psig. The reactions are conducted in the presence of hydrogen to suppress side reactions normally leading to the formation of unsaturated carbonaceous residues, or coke, which deposits upon and causes deactivation of the catalyst. The hydrogen rate, once-through or recycle, is generally within the range of from about 1,000 to about 10,000 SCF/Bbl, and preferably within the range of from about 2,000 to about 5,000 SCF/Bbl. The feed stream, in admixture with hydrogen, is passed over beds of the catalyst at space velocities ranging from about 0.1 to about 25 W/W/Hr., and preferably from about 0.5 to about 5.0 W/W/Hr.

The invention will be more fully understood by reference to the following selected nonlimiting examples and comparative data which illustrate its more salient features. All parts are given in terms of weight except as otherwise specified.

Several catalysts were prepared for demonstrative purposes from portions of particulate alumina of the type conventionally used in the manufacture of commercial reforming catalysts. The portions of alumina were impregnated with a solution of salts of the metals to be composited therewith, treated and activated and then employed as catalysts in a series of representative reforming reactions. The portions of alumina, except in the instance wherein bimetallic platinum-iridium catalysts (Catalysts A and B), and platinum catalyst (Catalyst C), all of which were prepared and employed as controls for comparative purpose, were impregnated with aqueous acid solutions containing a mixture of platinum, iridium, and palladium salts (Catalysts D, E, and F). The platinum-iridium catalysts (Catalysts A and B) were similarly prepared except that the palladium salt was not added to the solution and, as regards the platinum catalyst (Catalyst C), both the iridium and palladium salts were eliminated from the solution.

These series of catalysts were each evaluated in a continuously operated reactor for reforming naphtha at essentially the same conditions of temperature, pressure and hydrogen rate. The space velocity of the several reactions was varied, as identified in the tabulated data. The data related to catalyst preparation, and naphtha reforming, are given below, the data on catalyst preparations being given in the examples and demonstrations immediately following:

EXAMPLES
CATALYST PREPARATIONS

Catalyst A (Platinum-High Iridium)

A portion of high purity gamma alumina extrudates, previously calcined, was crushed and screened to 14–35 mesh (Tyler), then calcined about 2 hours in a flow of air or nitrogen at 1000°F. The calcined alumina (50.00 gms) was impregnated with a solution prepared by mixing 6.00 cc. Pt stock solution (25.0 mg. Pt/ml and 27.3 mg. Cl/cc.) and 7.74 cc. Ir stock solution (19.4 mg. Ir/ml, 25.5 mg. Cl/cc.) and diluted to approximately 65 ml with deionized water. After allowing the solution to stand for a period of one hour, by which time the remaining solution, if any, was colorless, the catalyst was dried in the vacuum oven to about 400°F. The catalyst was then charged to a resistance heated Vycor tube and heated at 950°–1,000°F. in a flow of nitrogen for 3 hours and was then reduced in hydrogen at 900°–910°F. for 2 hours. The catalyst was then sulfided by treatment with a flowing hydrogen-$H_2S$ mixture (0.3 percent $H_2S$) which was further diluted with hydrogen and nitrogen. This was done at 900°–910°F. until $H_2S$ broke through the bottom of the bed and was detected with moist lead acetate paper.

The composition of this Catalyst A is as follows:

Pt, 0.29%; Ir, 0.32%; Cl, 0.65%; S, 0.10%.

Catalyst B (Platinum-Low Iridium)

A previously calcined portion of gamma alumina particles was calcined, again as in the preparation of Catalyst A. The portion of alumina (50.00 gm) was then impregnated with a solution similar to that used in the preparation of Catalyst A except that it contained one-half as much of the iridium stock solution, and 1.81 milliliters of an aqueous solution which contaiined 48.6 mg of chloride/ml as HCl. After impregnation, the catalyst was dried, calcined, reduced and sulfided as in the preparation of Catalyst A.

The catalyst composition is as follows:

Pt, 0.30%; Ir, 0.16%; Cl, 0.67%; S, 0.14%.

Catalyst C (Platinum)

Another portion of previously calcined gamma alumina of 14–35 mesh particle size was calcined as in the preparation of Catalysts A and B. Alumina (50.00 g) was impregnated with a solution containing 6.00 ml chloroplatinic acid solution containing 25.0 mg Pt/ml, and 27.3 mg Cl/ml and 2.80 milliliters of an aqueous solution which contained 48.6 mg of chloride/ml as HCl diluted to about 65 ml with deionized water. The platinum-alumina precatalyst was dried, calcined and reduced as described in the procedure for Catalyst A. This catalyst was not sulfided as were the iridium catalysts.

The composition of the catalyst is as follows:

Pt, 0.29%; Cl, 0.60%.

Catalyst D (Platinum-Iridium-Palladium)

Again, a previously calcined portion of gamma alumina particles was further calcined as in the preparation of Catalyst A. The alumina (50.00 g) was impregnated with a solution containing 6.00 ml of chloroplatinic acid stock solution containing 25.0 mg Pt/ml, and 27.3 mg Cl/ml, 7.74 ml of chloroiridic acid stock solution containing 19.4 mg Ir/ml and 25.5 mg Cl/ml, 0.30 ml of a chloropalladous acid stock solution containing 24.0 mg Cl/ml and 26.8 mg Cl/ml, and 1.64 ml of a hydrochloric acid stock solution containing 48.6 mg Cl/ml, all diluted to about 65 ml with deionized water. After impregnation, the catalyst was dried, calcined, reduced and sulfided as in the preparation of Catalysts A and B.

The composition of the catalysts is given as follow:

Pt, 0.31%; Ir, 0.16%; Cl, 0.68%; Pd, 0.008%; S, 0.16%.

Catalyst E (Platinum-Iridium-Palladium)

Particulate gamma alumina of 14–35 mesh particle size was calcined, again as in the preparation of Catalyst A. The alumina (50.00 g) was impregnated with a solution similar to that used for Catalyst D except that it contained an additional 0.30 ml of the solution of chloropalladous acid stock solution and the quantity of hydrochloric acid solution used was reduced to 1.32 ml. After impregnation, the catalyst was dried, calcined, reduced and sulfided as in the preparation of Catalyst A, B, and D.

The composition of the catalyst is as follows:

Pt, 0.31%; Ir, 0.15%; Cl, 0.67%; Pd, 0.025%; S, 0.11%.

Catalyst F (Platinum-Iridium-Palladium)

A portion of previously calcined gamma alumina of 14–35 mesh particle size was again calcined as in the preparation of Catalyst A. The alumina (50.00 g) was impregnated with a solution similar to that used for Catalyst D except that it contained an additional 1.26 ml of the stock solution of chloropalladous acid and the quantity of the hydrochloric acid stock solution used was reduced to 0.93 ml. After impregnation, the catalyst was dried, calcined, reduced and sulfided as in the preparation of Catalysts A, B, D, and E.

The composition of the catalyst is as follows:

Pt, 0.31%; Ir, 0.16%; Cl, 0.82%; Pd, 0.09%; S, 0.15%.

REFORMING RUNS

These several catalysts, after their preparation, were allowed to cool under nitrogen at low flow rate, handled under nitrogen, and stored under nitrogen and/or purified and dried hydrocarbon, generally normal heptane. Each was subsequently evaluated in extended reforming tests in a small continuous flow, once-through, or non-cyclic, reactor with a typical highly paraffinic Aramco feed and a typical, more naphthenic Baytown virgin naphtha feed, respectively. The inspections on each of the feeds are presented in Table 1 as follows:

TABLE 1

|  | Aramco Feed | Baytown Virgin Naphtha Feed |
|---|---|---|
| API Gravity | 60.2 | 54.8 |
| Octane, RON | 40.0 | 56.3 |
| Total Aromatics (Wt.) | 15.1 | 16.5 |
| Total Naphthenes (Wt.) | 22.6 | 38.5 |
| Total Paraffins (Wt.) | 62.7 | 41.7 |
| Distillation (ASTM-D86) | | |
| IBP, °F. | 212 | 202 |
| 5% | 232 | 220 |
| 10 | 236 | 222 |
| 20 | 244 | 234 |
| 30 | 251 | 240 |
| 40 | 260 | 245 |
| 50 | 269 | 258 |
| 60 | 279 | 267 |
| 70 | 290 | 280 |
| 80 | 302 | 293 |
| 90 | 315 | 312 |
| 95 | 325 | 327 |
| FBP, °F. | 381 | 393 |

TABLE 1-Continued

A series of reforming runs, as shown by reference to Tables 2 through 6, were conducted with each of these several catalysts, Catalysts A, B and C being employed as references for determination of the effectiveness of the novel catalysts of this invention which employ the triumvirate of metals, viz., platinum, iridium and palladium (Catalysts D, E and F). Catalysts A and B, the "high iridium" and "low iridium" catalysts, respectively, were employed to reform each of the two feeds, to each of which was added 1.0 ppm of sulfur, this concentration of sulfur being about optimum for the high iridium catalyst. The "platinum only" catalyst (Catalyst C) was used to reform the Aramco feed at generally optimum conditions, the feed containing no added sulfur. Catalyst D, which contained an optimum concentration of palladium, as shown by reference to Tables 7 through 9, was employed to reform each of the two feeds, the Aramco Naphtha at different sulfur levels, viz., at 1.0 ppm of sulfur and at 0.4 ppm of sulfur, and the Baytown Naphtha at 0.4 ppm of sulfur, to obtain comparisons between the activity and selectivity of Catalysts A, B and C employed as standards at the generally optimum conditions of each. Results of tests conducted on Catalysts E and F, containing higher concentrations of palladium, on only one feed at two sulfur levels are given in Tables 10, 11 and 12 for comparison with Catalyst D, containing an optimum level of palladium.

Each of the reforming tests was conducted at conditions, inclusive of the following:

| Sandbath Temperature, °F | 925 (Isothermal) (920°F., E.I.T.)[1] |
|---|---|
| Pressure, Psi | 200 |
| Hydrogen Recycle Rate, SCF/B | 4800 |

1. Equivalent Isothermal Temperature of catalyst bed. The space velocities, which were varied in the several runs, are given in the data tabulated below, along with the results obtained for the individual runs, this including for the individual runs the catalyst age, in hours, the $C_5^+$ Product Yield (volume percent) and the analyzed Aromatics Concentration in the $C_5^+$ Product (volume percent), the latter being given along with the calculated approximate Research Octane Number (RON).

TABLE 2

CATALYST A - 0.29% Pt; 0.32% Ir; 0.65% Cl
Run Conditions: Aramco Naphtha at 1.0 ppm S
1.0 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 18.8 | 49.8 | 81.6 | 106.7 |
| 25.8 | 56.5 | 75.7 | 1044.3 |
| 42.8 | 56.6 | 75.3 | 104.2 |
| 49.8 | 58.2 | 73.8 | 103.6 |
| 121.8 | 60.2 | 70.7 | 102.3 |

TABLE 2-Continued

CATALYST A - 0.29% Pt; 0.32% Ir; 0.65% Cl
Run Conditions: Aramco Naphtha at 1.0 ppm S
1.0 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 138.8 | 60.5 | 71.8 | 102.8 |
| 145.8 | 59.9 | 72.4 | 103.0 |
| 162.8 | 60.3 | 72.5 | 103.0 |
| 169.8 | 59.5 | 72.8 | 103.2 |
| 186.8 | 59.9 | 71.8 | 102.7 |
| 193.8 | 59.0 | 73.2 | 103.3 |
| 210.8 | 59.3 | 72.4 | 103.0 |
| 217.8 | 59.6 | 71.9 | 102.8 |
| 313.8 | 60.1 | 70.5 | 102.2 |
| 330.8 | 58.8 | 71.8 | 102.8 |
| 337.8 | 60.3 | 71.0 | 102.4 |
| 354.8 | 59.8 | 71.4 | 102.6 |
| 361.8 | 60.1 | 71.3 | 102.5 |
| 378.8 | 58.9 | 71.8 | 102.8 |
| 385.8 | 59.6 | 70.2 | 102.1 |
| 481.8 | 60.2 | 71.0 | 102.4 |

TABLE 3

CATALYST A
Run Conditions: Aramco Naphtha at 1.0 ppm S
2.6 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 22.8 | 68.7 | 66.1 | 100.4 |
| 29.8 | 70.4 | 63.7 | 99.5 |
| 46.8 | 71.2 | 62.2 | 98.8 |
| 53.8 | 71.6 | 61.6 | 98.6 |
| 125.8 | 70.2 | 61.2 | 98.5 |
| 173.8 | 68.9 | 62.6 | 99.0 |
| 189.8 | 67.8 | 63.1 | 99.2 |
| 196.8 | 69.7 | 62.9 | 99.2 |
| 268.8 | 69.8 | 60.6 | 98.2 |
| 285.8 | 68.5 | 62.0 | 98.8 |
| 292.8 | 68.1 | 61.5 | 98.6 |
| 309.8 | 68.4 | 61.4 | 98.6 |
| 316.8 | 69.7 | 63.2 | 99.3 |
| 333.8 | 68.5 | 61.9 | 98.7 |
| 340.8 | 70.0 | 61.0 | 98.4 |
| 357.8 | 69.0 | 59.9 | 98.0 |
| 364.8 | 69.2 | 61.6 | 98.6 |
| 436.8 | 68.4 | 60.5 | 98.2 |
| 453.8 | 68.6 | 61.3 | 98.5 |
| 460.8 | 67.6 | 60.8 | 98.3 |
| 477.8 | 68.8 | 60.8 | 98.3 |
| 484.8 | 69.6 | 61.3 | 98.5 |
| 501.8 | 69.2 | 61.4 | 98.5 |
| 508.8 | 69.1 | 60.5 | 98.2 |
| 535.8 | 68.1 | 60.7 | 98.3 |
| 542.8 | 69.6 | 60.2 | 98.1 |

TABLE 4

CATALYST A
Run Conditions: Baytown Virgin Naphtha at 1.0 ppm S
2.7 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 19.5 | 73.5 | 74.2 | 103.7 |
| 26.5 | 77.3 | 70.3 | 102.2 |
| 43.5 | 77.5 | 70.1 | 102.1 |
| 50.5 | 78.8 | 69.5 | 101.8 |
| 122.5 | 79.6 | 66.8 | 100.7 |
| 139.5 | 80.1 | 67.2 | 100.9 |
| 146.5 | 80.0 | 67.0 | 100.8 |
| 163.5 | 80.0 | 67.0 | 100.8 |
| 170.5 | 79.7 | 66.6 | 100.7 |
| 187.5 | 79.6 | 66.7 | 100.7 |
| 194.5 | 80.7 | 67.0 | 100.8 |
| 211.5 | 79.9 | 65.2 | 100.1 |
| 218.5 | 80.8 | 66.4 | 100.6 |

TABLE 4-Continued

CATALYST A
Run Conditions: Baytown Virgin Naphtha at 1.0 ppm S
2.7 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 290.5 | 80.1 | 66.2 | 100.5 |
| 307.5 | 79.7 | 66.5 | 100.6 |
| 314.5 | 80.3 | 66.0 | 100.4 |
| 331.5 | 79.4 | 66.8 | 100.7 |
| 338.5 | 80.8 | 66.3 | 100.5 |
| 355.5 | 80.5 | 66.2 | 100.5 |
| 362.5 | 79.0 | 67.3 | 100.9 |
| 379.5 | 80.1 | 66.2 | 100.5 |
| 386.5 | 78.1 | 67.1 | 100.9 |
| 458.5 | 79.9 | 66.5 | 100.6 |
| 475.5 | 80.7 | 66.8 | 100.7 |
| 482.5 | 80.3 | 64.5 | 99.8 |

TABLE 5

CATALYST B - 0.30% Pt; 0.16% Ir; 0.67% Cl
Run Conditions: Aramco Naphtha at 1.0 ppm S
1.1 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 26.0 | 66.9 | 67.9 | 100.4 |
| 50.0 | 70.1 | 65.8 | 99.7 |
| 122.0 | 68.4 | 64.7 | 99.2 |
| 146.0 | 68.3 | 64.7 | 99.3 |
| 170.0 | 68.9 | 64.8 | 99.3 |
| 194.0 | 68.6 | 63.1 | 98.8 |
| 218.0 | 68.6 | 62.0 | 98.5 |
| 290.0 | 70.1 | 65.3 | 99.3 |
| 314.0 | 69.6 | 69.6 | 98.8 |

TABLE 6

CATALYST C - 0.29% Pt; 0.60% Cl
Run Conditions: Aramco Naphtha at 0.0 ppm S
1.1 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 23.0 | 64.6 | 64.4 | 99.4 |
| 46.0 | 67.1 | 67.0 | 99.8 |
| 69.0 | 66.0 | 63.1 | 99.0 |
| 92.0 | 66.3 | 62.5 | 98.8 |
| 116.0 | 67.7 | 60.5 | 98.1 |
| 139.0 | 68.1 | 58.4 | 97.6 |
| 162.0 | 68.8 | 59.1 | 97.6 |
| 185.0 | 69.6 | 57.1 | 97.2 |

TABLE 7

CATALYST D - 0.31% Pt; 0.16% Ir; 0.008% Pd; 0.68% Cl.
Run Conditions: Aramco Naphtha at 1.0 ppm S
1.0 W/Hr./W Space Velocity

| Hours on Feed (End of Balance) | $C_5^+$ Product Yield (Volume %) | Aromatics in $C_5^+$ Product (Volume %) | Calculated RON |
|---|---|---|---|
| 22.9 | 66.0 | 72.9 | 103.2 |
| 46.9 | 66.6 | 70.1 | 102.1 |
| 166.9 | 67.4 | 67.4 | 101.0 |
| 190.9 | 67.7 | 69.6 | 101.9 |
| 214.9 | 68.0 | 70.0 | 102.0 |
| 310.9 | 68.0 | 69.7 | 101.9 |
| 316.2 | 68.5 | 70.3 | 102.2 |

TABLE 8

CATALYST D
Run Conditions: Aramco Naphtha at 0.4 ppm S
1.0 W/Hr./W Space Velocity

| Hours on Feed (End of Balance) | C₅⁺ Product Yield (Volume %) | Aromatics in C₅⁺ Product (Volume %) | Calculated RON |
|---|---|---|---|
| 23.0 | 63.9 | 72.8 | 103.2 |
| 46.0 | 67.1 | 72.0 | 102.9 |
| 118.0 | 65.9 | 68.3 | 101.4 |
| 142.0 | 65.5 | 68.2 | 101.3 |
| 214.0 | 64.1 | 71.4 | 102.6 |
| 238.0 | 64.2 | 70.6 | 102.3 |
| 310.0 | 63.6 | 70.1 | 102.1 |
| 334.0 | 63.6 | 70.0 | 102.0 |

TABLE 9

CATALYST D
Run Conditions: Baytown Virgin Naphtha at 0.4 ppm S
2.7 W/Hr./W Space Velocity

| Hours on Feed (End of Balance) | C₅⁺ Product Yield (Volume %) | Aromatics in C₅⁺ Product (Volume %) | Calculated RON |
|---|---|---|---|
| 24.2 | 81.4 | 67.0 | 100.8 |
| 48.2 | 80.1 | 63.8 | 99.5 |
| 120.2 | 82.2 | 66.3 | 100.5 |
| 145.2 | 81.3 | 65.6 | 100.3 |
| 169.2 | 81.5 | 67.1 | 100.8 |
| 193.2 | 81.1 | 67.3 | 100.9 |
| 217.3 | 80.2 | 63.9 | 99.5 |
| 289.3 | 80.5 | 65.2 | 100.1 |
| 313.3 | 79.9 | 68.3 | 101.4 |

TABLE 10

CATALYST E - 0.31% Pt; 0.15% Ir; 0.025% Pd; 0.67% Cl
Run Conditions: Aramco Naphtha at 1.0 ppm S
1.1 W/Hr./W Space Velocity

| Hours on Feed (End of Balance) | C₅⁺ Product Yield (Volume %) | Aromatics in C₅⁺ Product (Volume %) | Calculated RON |
|---|---|---|---|
| 28.0 | 64.2 | 68.3 | 101.3 |
| 52.0 | 68.6 | 65.0 | 100.0 |
| 124.0 | 67.8 | 66.4 | 100.6 |
| 147.5 | 69.3 | 65.1 | 100.0 |

TABLE 11

CATALYST E
Run Conditions: Aramco Naphtha at 0.4 ppm S
1.0 W/Hr./W Space Velocity

| Hours on Feed (End of Balance) | C₅⁺ Product Yield (Volume %) | Aromatics in C₅⁺ Product (Volume %) | Calculated RON |
|---|---|---|---|
| 22.5 | 67.0 | 68.9 | 101.6 |
| 46.5 | 66.7 | 66.7 | 100.7 |
| 118.5 | 66.4 | 66.7 | 100.7 |
| 142.5 | 66.7 | 68.3 | 101.3 |
| 166.5 | 66.1 | 68.1 | 101.3 |
| 190.5 | 64.7 | 69.0 | 101.6 |
| 214.5 | 64.9 | 68.1 | 101.3 |
| 286.5 | 63.7 | 68.2 | 101.3 |
| 310.5 | 63.4 | 68.4 | 101.4 |
| 334.5 | 62.8 | 68.6 | 101.5 |

TABLE 12

CATALYST F - 0.31% Pt; 0.16% Ir; 0.09% Pd; 0.82% Cl
Run Conditions: Aramco Naphtha at 1.0 ppm S
1.0 W/Hr./W Space Velocity

| Hours on Feed (End of Balance) | C₅⁺ Product Yield (Volume %) | Aromatics in C₅⁺ Product (Volume %) | Calculated RON |
|---|---|---|---|
| 21.8 | 67.1 | 67.4 | 101.0 |
| 45.8 | 68.3 | 65.9 | 100.4 |
| 116.8 | 66.8 | 64.2 | 99.7 |
| 140.8 | 67.6 | 65.0 | 100.0 |
| 164.8 | 67.2 | 63.5 | 99.4 |
| 188.8 | 67.8 | 63.2 | 99.3 |
| 212.8 | 67.7 | 64.9 | 99.9 |
| 314.1 | 66.7 | 64.2 | 99.7 |

Figure 1:
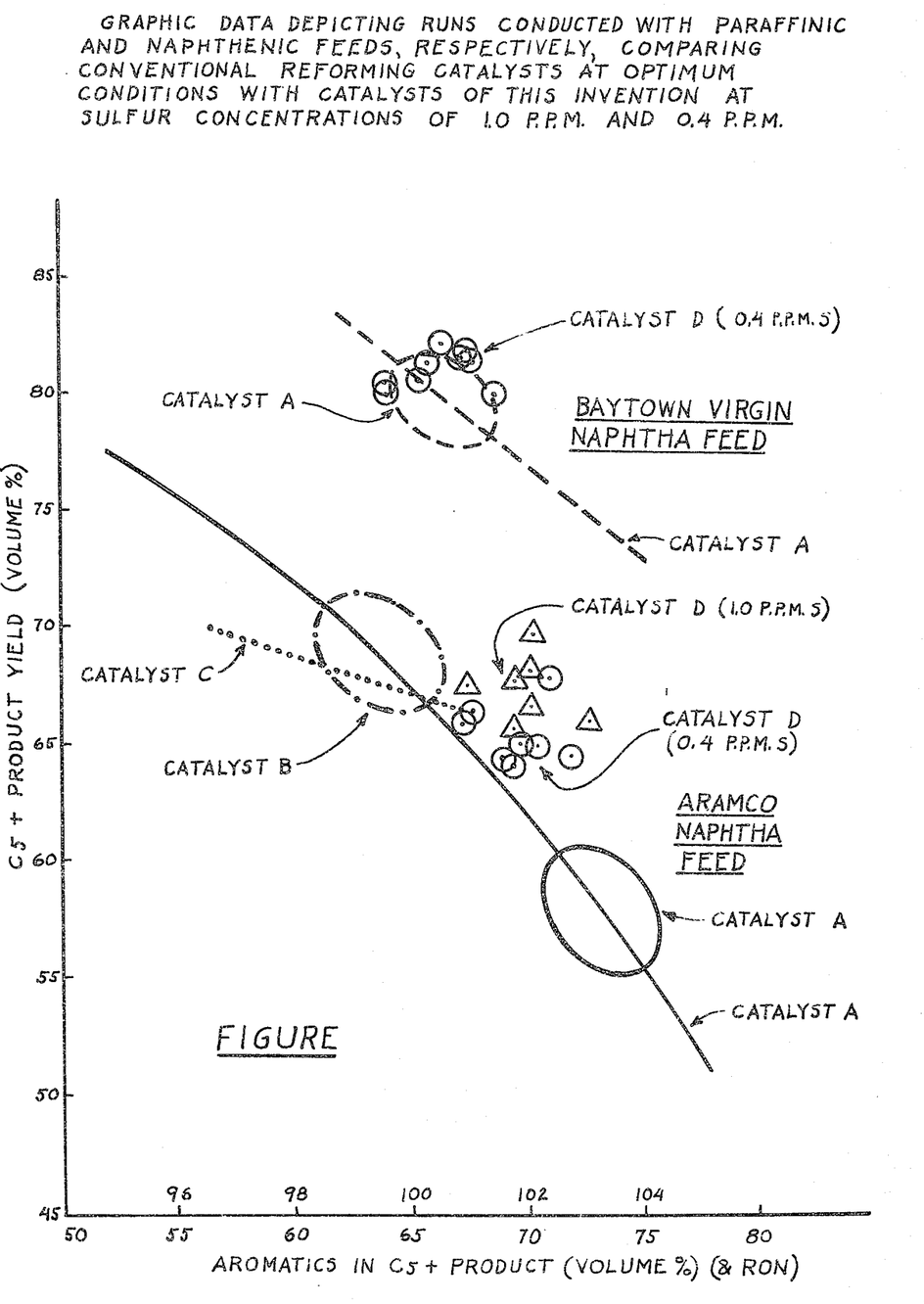

The more important aspects of these data are graphically illustrated, for convenience, by reference to the attached FIGURE. In the FIGURE, the data obtained for the series of runs employing Catalysts A, B, C and D are plotted in terms of $C_5^+$ Product Yield (volume percent), which is a measure of the selectivity of the catalysts, and the Aromatics Concentration (volume percent) of the $C_5^+$ Product, which is a measure of the activity of the catalysts. The $C_5^+$ Product Yield (volume percent) is plotted on the vertical axis and the Aromatics Concentration (volume percent) is plotted on the horizontal axis of the graph. Additionally, the approximate Research Octane Number (RON), calculated on the basis of aromatics concentration, is plotted on the horizontal axis of the graph.

For purposes of comparison, the FIGURE depicts graphical data relating to a large number of runs made with Catalysts A, B and C of which the data given in Tables 2 through 6 are typical, and data plotted from runs made with Catalyst D. The activity-selectivity curve for Catalyst A, presented graphically in the FIGURE, is thus inclusive of the two runs for which data are listed in Tables 2 and 3, these data being typical of a larger group of runs from which the entire activity-selectivity curve for Catalyst A is taken and employed as a standard for the 1.0 ppm sufur Aramco feed runs. The solid unbroken line in the FIGURE thus illustrates a standard to which other data may be compared in a manner which is more easily understood than tabular data. Likewise, the dashed line in the FIGURE was drawn from a larger set of data of which the data in Table 4 are typical, again for Catalyst A, but in this case for Baytown virgin naphtha utilizing 1.0 ppm sulfur. The elipses depicted in the FIGURE represents areas in which a collection of data points occur. The solid ellipse for Aramco feed and the dashed ellipse for the Baytown feed represent, respectively, the areas in which the lined-out activity of Catalyst A occurs as illustrated in the data presented by Tables 2 and 4, respectively. Lined-out activity means a relatively constant activity and selectivity which occurs after the initial period of an operating run when the activity significantly decreases and becomes relatively stable. The dashed-dot ellipse of the FIGURE represents an area in which the data for the lined-out activity of Catalyst B occurs, the data tabulated in Table 5 being illustrative. The dotted line depicted in the FIGURE represents a collection of data of which the run on Catalyst C as tabulated in Table 6 is illustrative. In the case of this type of catalyst, there is typically no lined-out activity. The catalyst deactivates and data on any single run moves from right to left along the dotted line (within the range of experimental error).

In the FIGURE, there is thus presented a summary of data, the lines and ellipses made with each of Catalysts A and B for both the Aramco and Baytown virgin naphtha feeds, each containing sulfur at the 1.0 ppm level. Runs conducted with Catalyst C, also depicted on the graph, were conducted only with the Aramco feed which contained no sulfur. The runs conducted by reforming the Aramco feed are presented in the FIGURE by the graphical data presented at the lower portion of the sheet, and those conducted by reforming the Baytown virgin naphtha feed at the upper portion of the sheet. Runs conducted with Catalyst A on the Baytown virgin naphtha feed are depicted (at the upper portion of the sheet) in the FIGURE by a broken or dashed black line, and the lined-out activity of the catalyst is depicted by the dashed line ellipse within which would lie a collection of points representative of the lined-out activity of the catalyst.

Runs made with Catalyst D on both the Aramco feed and the Baytown virgin naphtha feeds at sulfur levels of 0.4 ppm are plotted as clusters of points on the FIGURE, and one run with Catalyst D made on the Aramco naphtha feed at a sulfur level of 1.0 ppm is plotted as a cluster of points on the FIGURE. In contrasting these data with the data presented for Catalysts A, B and C, a number of observations are apparent concerning the effectiveness of platinum-iridium-palladium catalysts, as represented by Catalyst D vis-a-vis platinum and platinum-iridium catalysts generally.

Referring to the FIGURE, it will be observed that in treating the Aramco feed at the 1 ppm sulfur level, the platinum-iridium-palladium catalyst (Catalyst D) is only slightly lower in activity than the platinum-iridium catalyst (Catalyst A), albeit the former contains only about one-half as much iridium. On the other hand, Catalyst D has superior selectivity, providing 3–5 percent better $C_5^+$ Product Yield at constant octane. Thus, for a decrease of about 1–2 RON, a selectivity advantage of 3–5 percent is gained, and only about one-half as much iridium is used in preparation of the catalyst.

A catalyst similar in composition to Catalyst D, except that it contains no palladium, but only platinum and iridium in equal concentration, i.e., Catalyst B, is a poorer catalyst. The lined-out activity of Catalyst B thus produces a $C_5^+$ product about 2 RON below that of Catalyst D at the same conditions of operation. The selectivity of Catalyst D at lower octane number levels is also generally better than that of Catalysts A and B at the same octane levels.

Again referring to the FIGURE, it will be observed that in treating the Aramco feed at the 0.4 ppm sulfur level, that Catalyst D has about the same activity as at its optimum sulfur level of 1.0 ppm, but it shows less selectivity advantage than at its optimum which ranges 2–3 percent less than at the 1.0 ppm sufur level. Nevertheless, there is a 1–2 percent yield advantage for Catalyst D at a 0.4 ppm sulfur level as compared with Catalyst A at its optimum conditions. When Catalyst D is compared with Catalyst A, again as shown in the FIGURE wherein data regarding the performance of these catalysts is depicted as in processing Baytown naphtha feed, each at its optimum sulfur level, it is seen that Catalyst D provides a ½ to 1 percent yield advantage, at given RON level, over Catalyst A. Catalyst D, on the other hand, possesses about the same activity as a catalyst which contains about twice as much iridium, but no palladium. Thus, even though the advantages of the platinum-iridium-palladium catalysts are not sharply distinguished as with the more difficult paraffinic feeds, the advantages are nonetheless present. Moreover, since the optimum sulfur level in processing the Aramco feed is 1.0 ppm, it is also apparent that better selectivity would occur at the 1.0 ppm sulfur level vis-a-vis the 0.4 ppm sulfur level in processing the Baytown virgin naphtha feed.

In the runs conducted with Catalysts A and D which utilized Baytown virgin naphtha feed containing 0.4 ppm sulfur, it is apparent that Catalyst D possesses a selectivity advantage over Catalyst A. Thus, at a given octane level, Catalyst D, at optimum conditions, provides from 1–2 percent $C_5^+$ Product yield advantage.

From these series of data, it is apparent that the incorporation of palladium with platinum-iridium catalysts makes these catalysts much more sulfur-tolerant. The substitution of palladium for iridium actually produces a superior catalyst. In other words, platinum-iridium-palladium catalysts are superior to platinum-iridium catalysts when these different catalysts are each operated at their optimum conditions. In fact, as illustrated by the data, even though Catalyst D operated effectively at the 0.4 ppm sulfur level, and provided advantages over its bimetallic counterpart, its performance is even better at the 1.0 ppm sulfur level where Catalyst A operates at its optimum. Another advantage is that the use of large amounts of palladium in these catalysts is unnecessary, the smaller amounts of palladium being more effective than the larger concentrations. For example, Catalyst D, which contains about one-half as much palladium as Catalyst E, shows superior activity and selectivity as contrasted with the latter. This is shown at both sulfur levels by comparison of Tables 7 and 10, and 8 and 11. Likewise, Catalyst F shows poorer activity and selectivity than Catalyst D, as shown by comparisons between Tables 7 and 12. Comparing Catalysts E and F (Tables 10, 11 and 12) with Catalyst B (Table 5), similar to the former catalysts but containing no palladium, it becomes apparent that both palladium-containing catalysts exhibit no significant activity advantage but show a selectivity advantage amounting to about ½-1 percent yield at any given octane. All palladium levels appear to provide selectivity advantages over the same catalyst, without the palladium. The low level of palladium, however, provides both activity and selectivity as contrasted with high palladium or with similar catalysts containing no palladium.

It is essential that the catalyst composition of this invention contain the triumvirate of metals--viz., platinum, iridium and palladium, deposited or otherwise incorporated, preferably impregnated, upon a porous inorganic oxide base in catalytically active concentrations. The catalytically active metals can be present, e.g., as metallic metal, or as oxides, chlorides, oxychlorides, aluminates, carbides, hydrides, or sulfides of the metal, or as mixtures thereof with these and other less describable structures. Under the varying conditions of forming and using the catalysts, it is likely that the metals will vary in their actual distribution as oxides, chlorides, oxychlorides, aluminates, carbides, hydrides, sulfides, or reduced forms of the metals, or mixtures thereof with these and other less describable structures. The metals, however, are calculated on the basis of metallic metal. The catalytically active metals are composited with the porous inorganic oxide bases by methods known to the art. Preferably, the metals are simultaneously impregnated on the support and, after impregnation of the support by contact with an acid solution, or solutions, of salts of the metals, the so-formed composite is dried at conditions ranging from about 200° to about 400°F., often at reduced pressure or in a stream of flowing gas, then further dried and calcined at temperatures ranging up to about 1200°F. in an atmosphere which does not agglomerate the iridium or other metals. The catalyst then may be contacted in situ or ex situ with halogen, halogen precursor, halide or halide precursor. Halogen, preferably chlorine, and next in preference fluorine, is generally added at the time of catalyst preparation as the acid in the metals impregnation solution. Additional halogen can be added during reforming operations to maintain desired operating levels. The catalyst is then sulfided, generally by contact with $H_2S$ in dilute gaseous mixture to convert at least some of the metals to the corresponding sulfides. As with the halides, the feeds can be spiked with sulfur compounds, or other higher sulfur feed, to add sulfide to the catalyst during operation. $H_2S$, HCl, or other gases containing sulfur or halogen can also be added to the recycle gas streams to change catalyst sulfur halide levels during operation.

It is apparent that various modifications and changes can be made without departing the spirit and scope of the present invention, an outstanding feature of which is that the octane quality of various hydrocarbon feedstocks, inclusive particularly of paraffinic feedstocks, can be upgraded and improved.

Having described the invention, what is claimed is:

1. A catalyst suitable for conversion of hydrocarbons comprising a composite of an acidic porous inorganic oxide support, platinum in concentration ranging from about 0.05 to about 3 percent, iridium in concentration ranging from about 0.05 to about 3 percent, palladium in concentration ranging from about 0.0001 to about 2.5 percent, and halogen in concentration ranging from about 0.1 to about 2.5 percent based on the total weight of the catalyst, the atom ratio of the platinum:iridium ranging from about 0.25:1 to about 5:1, and the atom ratio of iridium:palladium ranging from about 1:1 to about 40:1.

2. The catalyst of claim 1 wherein the composite comprises from about 0.1 to about 1.0 percent platinum, from about 0.1 to about 1.0 percent iridium, and from about 0.0005 to about 0.15 percent palladium.

3. The catalyst of claim 2 wherein the palladium ranges from about 0.0050 to about 0.050 percent.

4. The catalyst of claim 1 wherein the halogen is chlorine.

5. The catalyst of claim 1 wherein the composite contains from about 0.5 to about 1.5 percent halogen.

6. The catalyst of claim 1 wherein the porous inorganic oxide support is alumina.

7. The catalyst of claim 1 wherein the composite contains from about 0.001 to about 2 percent sulfur.

8. The catalyst of claim 1 wherein the composite contains from about 0.01 to about 0.1 percent sulfur.

9. The catalyst of claim 1 wherein the atom ratio of iridium:palladium ranges from about 2:1 to about 10:1.

10. The catalyst of claim 1 wherein the atom ratio of the platinum:iridium ranges from about 1:1 to about 2:1, and the atom ratio of the iridium:palladium ranges from about 2:1 to about 10:1.

11. The catalyst of claim 2 wherein the atom ratio of the platinum:iridium ranges from about 1:1 to about 2:1, and the atom ratio of the iridium:palladium ranges from about 2:1 to about 10:1.

12. The catalyst of claim 3 wherein the atom ratio of the platinum:iridium ranges from about 1:1 to about 2:1, and the atom ratio of the iridium:palladium ranges from about 2:1 to about 10:1.

13. A reforming catalyst comprising a composite of alumina, platinum in concentration ranging from about 0.05 to about 1 percent, iridium in concentration ranging from about 0.05 to about 1 percent, palladium in concentration ranging from about 0.0001 to about 2.5 percent, chlorine in concentration ranging from about 0.5 to about 1.5 percent, and sulfur in concentration ranging from about 0.001 to about 2 percent, the atom ratio of the platinum:iridium ranging from about 0.25:1 to about 5:1, and the atom ratio of iridium:palladium ranging from about 1:1 to about 40:1.

14. The composition of claim 13 wherein the palladium ranges from about 0.0050 to about 0.050 percent.

15. The catalyst of claim 13 wherein the alumina is gamma alumina, and the sum total concentration of the platinum and iridium ranges from about 0.3 to about 1 percent.

16. The catalyst of claim 13 wherein the sum total amount of platinum and iridium ranges from about 0.3 to about 1 percent, and the atom ratio of the iridium:palladium ranges from about 1:1 to about 40:1.

17. The catalyst of claim 13 wherein the sum total amount of platinum and iridium ranges from about 0.45 to about 0.70 percent, and the atom ratio of the iridium:palladium ranges from about 2:1 to about 10:1.

18. The catalyst of claim 13 wherein the atom ratio of the platinum:iridium ranges from about 1:1 to about 2:1, and the atom ratio of iridium:palladium ranges from about 2:1 to about 10:1.

19. The catalyst of claim 13 wherein the concentration of the palladium ranges from about 0.0005 to about 0.15 percent.

20. The catalyst of claim 19 wherein the atom ratio of the platinum:iridium ranges from about 1:1 to about 2:1, and the atom ratio of iridium:palladium ranges from about 2:1 to about 10:1.

21. A process for improving the octane quality of naphthas comprising contacting the said naphtha at reforming conditions with a composite comprising a porous inorganic oxide support, platinum in concentration ranging from about 0.05 to about 3 percent, iridium in concentration ranging from about 0.05 to about 3 percent, palladium in concentration ranging from about 0.0001 to about 2.5 percent, and halogen in concentration ranging from 0.1 to about 2.5 percent based on the total weight of the catalyst, the atom ratio of the platinum:iridium ranging from about 0.25:1 to about 5:1, and the atom ratio of iridium:palladium ranging from about 10:1 to about 40:1.

22. The process of claim 21 wherein the palladium ranges from about 0.0005 to about 0.15 percent.

23. The process of claim 21 wherein the palladium ranges from about 0.0050 to about 0.050 percent.

24. The process of claim 21 wherein the catalyst composite comprises from about 0.1 to about 1.0 percent platinum, from about 0.1 to about 1.0 percent iridium and from about 0.0005 to about 0.15 percent palladium.

25. The process of claim 24 wherein the sum total concentration of platinum and iridium ranges from about 0.3 to about 1 percent.

26. The process of claim 21 wherein the composite comprises from about 0.5 to about 1.5 percent halogen.

27. The process of claim 26 wherein the halogen is chlorine.

28. The process of claim 21 wherein the porous inorganic oxide support is alumina.

29. The process of claim 21 wherein the catalyst contains from about 0.001 to about 2 percent sulfur.

30. The process of claim 29 wherein the catalyst contains from about 0.01 to about 0.1 percent sulfur.

31. The process of claim 21 wherein reforming is conducted at temperatures ranging from about 600°F. to about 1,050°F., at pressures ranging from about 50 psig to about 750 psig, at space velocities ranging from about 0.1 to about 25 W/Hr./W, and at hydrogen rates ranging from about 1000 to about 10,000 SCF/Bbl.

32. The process of claim 31 wherein temperatures range from about 850°F. to about 1,000°F., pressures range from about 100 psig to about 250 psig, space velocities range from about 1.0 to about 5.0 W/W/Hr., and the hydrogen rate ranges from about 2,000 to about 5,000 SCF/Bbl.

33. The process of claim 21 wherein the atom ratio of the platinum:iridium ranges from about 1:1 to about 2:1, and the atom ratio of iridium:palladium ranges from about 2:1 to about 10:1.

* * * * *